United States Patent
Uchino et al.

(10) Patent No.: US 10,779,263 B2
(45) Date of Patent: Sep. 15, 2020

(54) BASE STATION AND WIRELESS COMMUNICATION METHOD USING CARRIER AGGREGATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP); Yuta Sagae, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/762,993

(22) PCT Filed: Jan. 20, 2014

(86) PCT No.: PCT/JP2014/050943
§ 371 (c)(1),
(2) Date: Jul. 23, 2015

(87) PCT Pub. No.: WO2014/125875
PCT Pub. Date: Aug. 21, 2014

(65) Prior Publication Data
US 2015/0373684 A1    Dec. 24, 2015

(30) Foreign Application Priority Data
Feb. 18, 2013 (JP) .................. 2013-029461

(51) Int. Cl.
*H04W 72/04* (2009.01)
*H04W 16/06* (2009.01)
(Continued)

(52) U.S. Cl.
CPC ....... *H04W 72/0406* (2013.01); *H04W 16/06* (2013.01); *H04W 72/0446* (2013.01);
(Continued)

(58) Field of Classification Search
CPC ... H04W 16/32; H04W 84/045; H04W 92/02; H04W 72/0406; H04W 72/0446;
(Continued)

(56) References Cited

U.S. PATENT DOCUMENTS

2004/0162083 A1* 8/2004 Chen .................. H04W 52/286
455/454
2007/0117537 A1    5/2007 Hui et al.
(Continued)

FOREIGN PATENT DOCUMENTS

| EP | 2 437 532 A1 | 4/2012 |
|----|--------------|--------|
| JP | 2012156980 A | 8/2012 |

OTHER PUBLICATIONS

International Search Report in corresponding PCT Application No. PCT/JP2014/050943 dated Apr. 1, 2014 (2 pages).
(Continued)

*Primary Examiner* — Ivan O Latorre
(74) *Attorney, Agent, or Firm* — Osha Liang LLP

(57) ABSTRACT

Techniques for assigning uplink dedicated resources in inter-site or inter-eNB carrier aggregation promptly are disclosed. One aspect of the present invention relates to a base station including a transmission and reception unit configured to use radio resources to communicate with a user equipment and a resource management unit configured to manage the radio resources, wherein the resource management unit comprises a pooling information storage unit configured to store pooling information indicative of radio resources reserved for the base station by a non-anchor base station in inter-eNB carrier aggregation, and the resource management unit autonomously assigns the radio resources indicated in the pooling information to the user equipment.

4 Claims, 6 Drawing Sheets

(51) Int. Cl.
*H04W 92/20* (2009.01)
*H04W 76/15* (2018.01)
(52) U.S. Cl.
CPC ........ *H04W 72/0453* (2013.01); *H04W 76/15* (2018.02); *H04W 92/20* (2013.01)
(58) Field of Classification Search
CPC . H04W 72/0453; H04W 28/16; H04W 92/20; H04W 16/06; H04W 76/15
USPC .......................... 370/328, 329, 330; 455/444
See application file for complete search history.

(56) References Cited

U.S. PATENT DOCUMENTS

| | | | | |
|---|---|---|---|---|
| 2009/0291640 | A1* | 11/2009 | Bhattad | H04W 72/0406 455/63.1 |
| 2010/0273468 | A1* | 10/2010 | Bienas | H04W 24/02 455/418 |
| 2011/0002275 | A1 | 1/2011 | Shousterman | |
| 2011/0053598 | A1* | 3/2011 | Ahluwalia | H04W 36/22 455/436 |
| 2012/0040684 | A1* | 2/2012 | Gao | H04W 28/08 455/453 |
| 2012/0113914 | A1* | 5/2012 | Zhao | H04L 5/0007 370/329 |
| 2012/0178467 | A1* | 7/2012 | Fujii | H04W 72/0406 455/452.1 |
| 2012/0264472 | A1* | 10/2012 | Nobukiyo | H04W 72/10 455/512 |
| 2012/0300749 | A1* | 11/2012 | Kondo | H04W 72/085 370/331 |
| 2013/0005378 | A1* | 1/2013 | Hasegawa | H04W 16/06 455/509 |
| 2013/0196678 | A1* | 8/2013 | Liu | H04W 28/16 455/452.1 |
| 2013/0272213 | A1* | 10/2013 | Manssour | H04W 72/121 370/329 |
| 2014/0003319 | A1* | 1/2014 | Etemad | H04W 28/08 370/312 |
| 2014/0036822 | A1* | 2/2014 | Maeda | H04W 72/04 370/329 |
| 2014/0073334 | A1* | 3/2014 | Chiang | H04W 76/00 455/450 |
| 2014/0198761 | A1* | 7/2014 | Hooli | H04W 72/08 370/329 |
| 2015/0282020 | A1* | 10/2015 | Pajukoski | H04W 28/26 370/331 |

OTHER PUBLICATIONS

Written Opinion issued in corresponding PCT Application No. PCT/JP2014/050943 dated Apr. 1, 2014 (3 pages).
3GPP TS 36.321 V11.1.0; "3rd Generation Partnership Project; Technical Specification Group Radio Access Network; Evolved Universal Terrestrial Radio Access Network (E-UTRA); Medium Access Control (MAC) protocol specification (Release 11)", Dec. 2012 (57 pages).
Extended European Search Report in counterpart European Application No. 14 75 1716.3 dated Jan. 15, 2016 (10 pages).
Office Action issued in the counterpart Japanese Patent Application No. 2013-029461, dated Apr. 18, 2017 (5 pages).
Office Action issued in corresponding Chinese Patent Application No. 201480009259.0, dated Mar. 2, 2018 (25 pages).
Office Action issued in corresponding Japanese Application No. 2013-029461, dated Dec. 5, 2017 (5 pages).
Office Action issued in corresponding Chinese Patent Application No. 201480009259.0, dated Oct. 9, 2018 (8 pages).

* cited by examiner

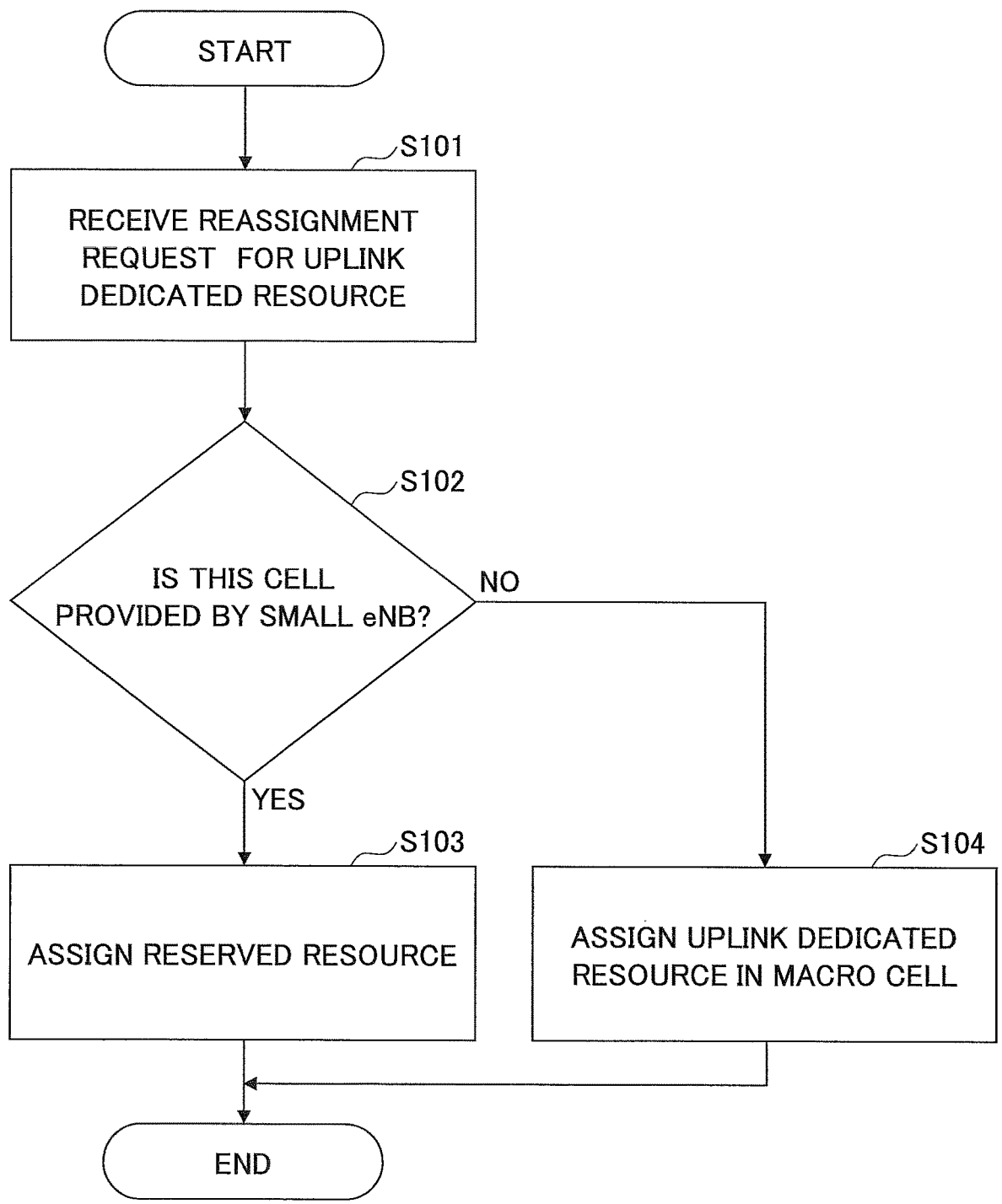

BASE STATION AND WIRELESS COMMUNICATION METHOD USING CARRIER AGGREGATION

TECHNICAL FIELD

The present invention generally relates to radio communication techniques and more specifically relates to radio communication using carrier aggregation.

BACKGROUND ART

Presently, as a next-generation communication standard of LTE (Long Term Evolution) scheme, 3GPP ($3^{rd}$ Generation Partnership Project) is promoting standardization of LTE-Advanced. In a LTE-Advanced system, a carrier aggregation (CA) technique is introduced to achieve a higher throughput than a LTE system while ensuring backward compatibility with the LTE system. In the carrier aggregation technique, a LTE carrier (also referred to as a component carrier) having the maximum bandwidth of 20 MHz supported by the LTE system is utilized as a basic component, and it is designed to implement communications in a wider band by employing such multiple component carriers simultaneously.

In the LTE-Advanced, small cell enhancement, where a mixture of a macro cell provided by a conventional base station and a small cell covering a smaller geographical area is used, is proposed. Typically, the small cell is disposed in a traffic intensive area such as a hot spot and an indoor area which is difficult for the macro cell to cover and is used to improve communication in these areas.

In a network architecture using the small cell enhancement, utilization of inter-site CA or inter-eNB CA, where a user equipment (UE) communicates using a macro base station (macro-eNB) serving a macro cell and a small base station (small-eNB) serving a small cell simultaneously, is discussed. In typical inter-site or inter-eNB CA, the macro base station serves as an anchor base station and manages the small base station serving as a non-anchor base station to implement the inter-site or inter-eNB CA with the user equipment.

FIG. 1 is a schematic view of the inter-site CA in the small cell enhancement. As is shown in FIG. 1, in the inter-site or inter-eNB carrier aggregation in the small cell enhancement, for example, reliability required control signals or C-plane data (Signaling Radio Bearer: SRB) are communicated by a macro base station serving as an anchor base station to a user equipment via a macro cell, and wideband communication required data signals or U-plane data (Data Radio Bearer: DRB) are communicated by a small base station serving as a non-anchor base station to the user equipment via a small cell.

Meanwhile, it is specified in the LTE system and the LTE-Advanced system that a base station assigns an uplink dedicated resource to a user equipment and uses the assigned uplink dedicated resource to obtain various information such as request information and feedback information from the user equipment. Examples of the uplink dedicated resources include a scheduling request, a PUCCH-CQI (Physical Uplink Control Channel-Channel Quality Indicator) and a SRS (Sounding Reference Signal).

The scheduling request is a resource for requesting abase station for an uplink grant (UL grant) to allow for data transmission when uplink data for transmission arise in the user equipment. The PUCCH-CQI is a resource for feeding downlink communication quality information back to the base station. The SRS is a resource for causing a base station to measure uplink communication quality information.

The uplink dedicated resources are assigned to a user equipment by a RRC (Radio Resource Control) layer signal. It is specified that upon occurrence of a predefined release trigger, the assigned uplink dedicated resources are autonomously released by a user equipment. For example, the release trigger of uplink dedicated resources may include a release command by a RRC layer signal, expiration of a TA (Time Alignment) timer, over-retransmission of the scheduling request and execution of a retransmission procedure.

It is specified that in the case where the inter-site or inter-eNB carrier aggregation is configured, a single base station (anchor base station) basically transmits and receives RRC signaling. If multiple base stations transmit and receive the RRC signaling, bearers for C-plane data or a SRB must be set between the user equipment and the respective base stations, which is not desirable from the viewpoint of network complexity.

Meanwhile, it is assumed that resources in a cell served by each base station are basically managed by that base station. This is because it is not practical that a macro base station or an anchor base station manages resources of all connected small base stations.

Thus, when an uplink dedicated resource in a cell served by a small base station is reassigned to a user equipment (for example, at restarting uplink data), a reassignment procedure of uplink dedicated resources as set forth will be performed among the user equipment, the macro base station and the small base station.

Specifically, it is assumed that after an earlier configured or assigned uplink dedicated resource in a small cell has been released, the uplink dedicated resource in the small cell must be reassigned to the user equipment due to some reasons. As is shown in FIG. 2, at step S1, a macro base station managing the small base station serving the small cell sends the small base station a resource assignment request for assigning the uplink dedicated resource to the user equipment.

Upon receiving the resource assignment request, at step S2, the small base station assigns the uplink dedicated resource to the user equipment and sends the macro base station a resource assignment response indicative of the assigned uplink dedicated resource.

Upon receiving the resource assignment response, at step S3, the macro base station sends the user equipment a RRC Connection Reconfiguration.

Upon receiving the RRC Connection Reconfiguration, at step S4, the user equipment performs a RRC connection reconfiguration operation based on the indicated uplink dedicated resource in the small base station and sends the macro base station a RRC Connection Reconfiguration Complete after completion of the operation.

Upon receiving the RRC Connection Reconfiguration Complete, at step S5, the macro base station sends the small base station an assignment completion indication. Then, radio communication is established between the user equipment and the small base station, and the user equipment can use the assigned uplink dedicated resource.

See 3GPP TS 36.321 V11.1.0 (2012-12) for further details, for example.

SUMMARY OF INVENTION

Problem to be Solved by the Invention

If the assigned uplink dedicated resource has been released in response to the above-stated release trigger and subsequently the uplink dedicated resource in the small cell must be reassigned to the user equipment, the above-stated random access procedure must be executed again, which would cause transmission and reception delay of user data or U-plane between the small base station and the user equipment.

Specifically, if a scheduling request has not been assigned, the user equipment must always perform the above-stated random access procedure to request the small base station for an uplink grant, which would cause transmission delay of uplink data. Also, if a periodic CQI has not been assigned, the small base station cannot know downlink communication quality for the small cell and accordingly cannot perform optimal link adaptation. In this case, the small cell would select any suitable MCS (Modulation and Coding Scheme) or a MCS estimated to be the most reliable. In addition, if a periodic SRS has not been assigned, the small base station cannot know uplink communication quality for the small cell and accordingly cannot perform optimal link adaptation.

In light of the above-stated problems, one objective of the present invention is to provide some techniques for assigning uplink dedicated resources promptly in the inter-site or inter-eNB carrier aggregation.

Means for Solving the Problem

In light of the above-stated problems, one aspect of the present invention relates to a base station comprising: a transmission and reception unit configured to use radio resources to communicate with a user equipment; and a resource management unit configured to manage the radio resources, wherein the resource management unit comprises a pooling information storage unit configured to store pooling information indicative of radio resources reserved for the base station by a non-anchor base station in inter-eNB carrier aggregation, and the resource management unit autonomously assigns the radio resources indicated in the pooling information to the user equipment.

Another aspect of the present invention relates to a base station comprising: a transmission and reception unit configured to use radio resources to communicate with a user equipment; and a resource management unit configured to manage the radio resources, wherein the resource management unit reserves a portion of the radio resources for an anchor base station in inter-eNB carrier aggregation and sends the anchor base station pooling information indicative of the reserved radio resources.

Advantage of the Invention

According to the present invention, uplink dedicated resources can be assigned promptly in inter-site or inter-eNB carrier aggregation.

BRIEF DESCRIPTION OF DRAWINGS

FIG. 7 is a flowchart for illustrating an uplink dedicated resource management operation in a macro base station according to one embodiment of the present invention.

EMBODIMENTS OF THE INVENTION

Embodiments of the present invention are described below with reference to the drawings.

Briefly overviewing embodiments of the present invention as described below, an anchor base station in inter-site or inter-eNB carrier aggregation (referred to as inter-eNB carrier aggregation hereinafter) receives and stores pooling information indicative of radio resources reserved by a non-anchor base station for the anchor base station in advance. When an uplink dedicated resource in a small cell served by the non-anchor base station has to be assigned to a user equipment, the anchor base station refers to the stored pooling information to assign the radio resources in the small cell indicated in the pooling information reserved for the anchor base station in an autonomous manner, that is, without performing assignment operations for uplink dedicated resources between the anchor base station and the non-anchor base station. Here, the anchor base station may be a base station managing RRC, a base station with which an interface to a CN (Core Network) has been established, or a base station managing a primary cell (PCell) in CA.

Figure 1:
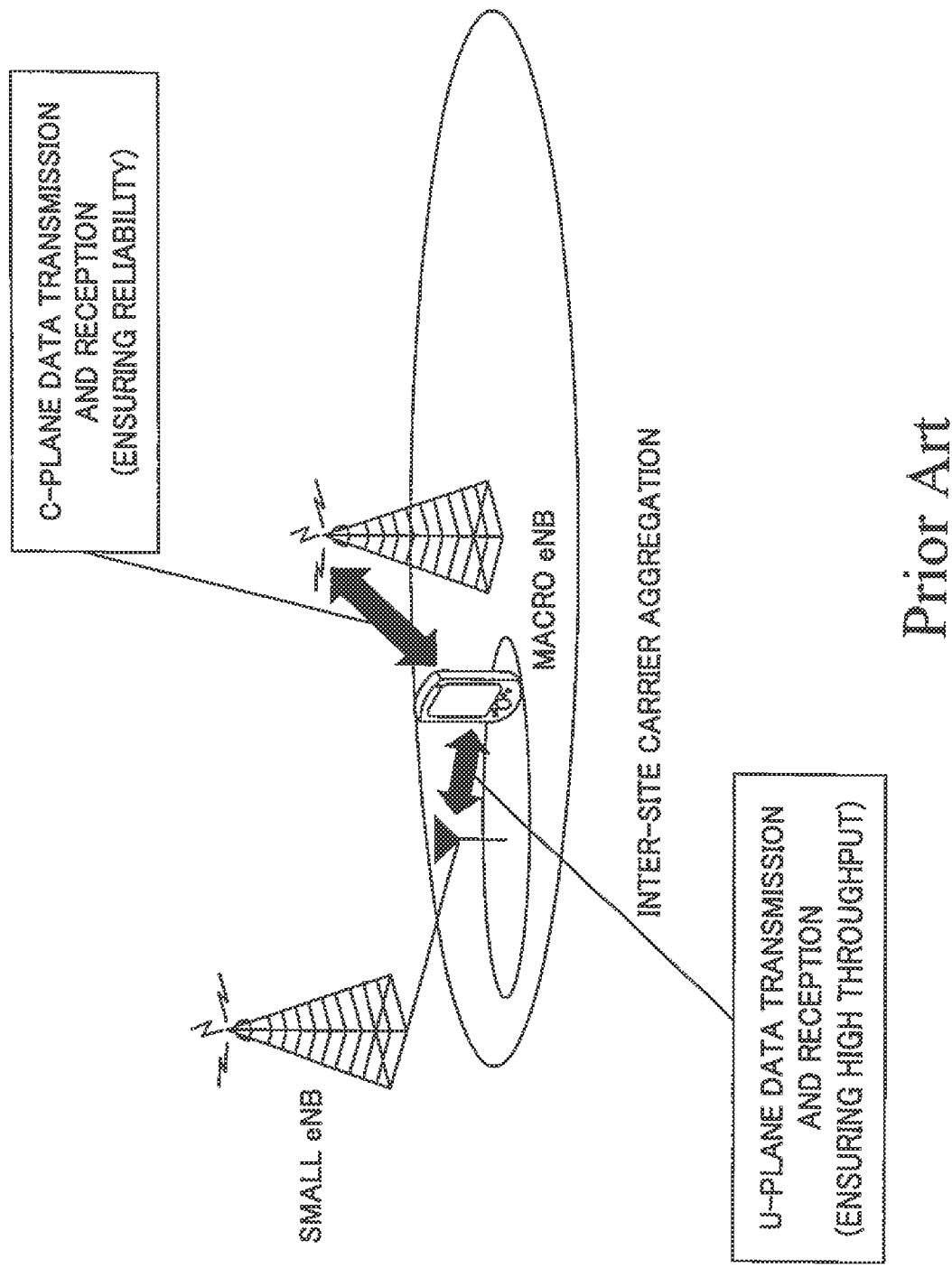
FIG. 1 is a schematic view of inter-site carrier aggregation in small cell enhancement.
Figure 2:
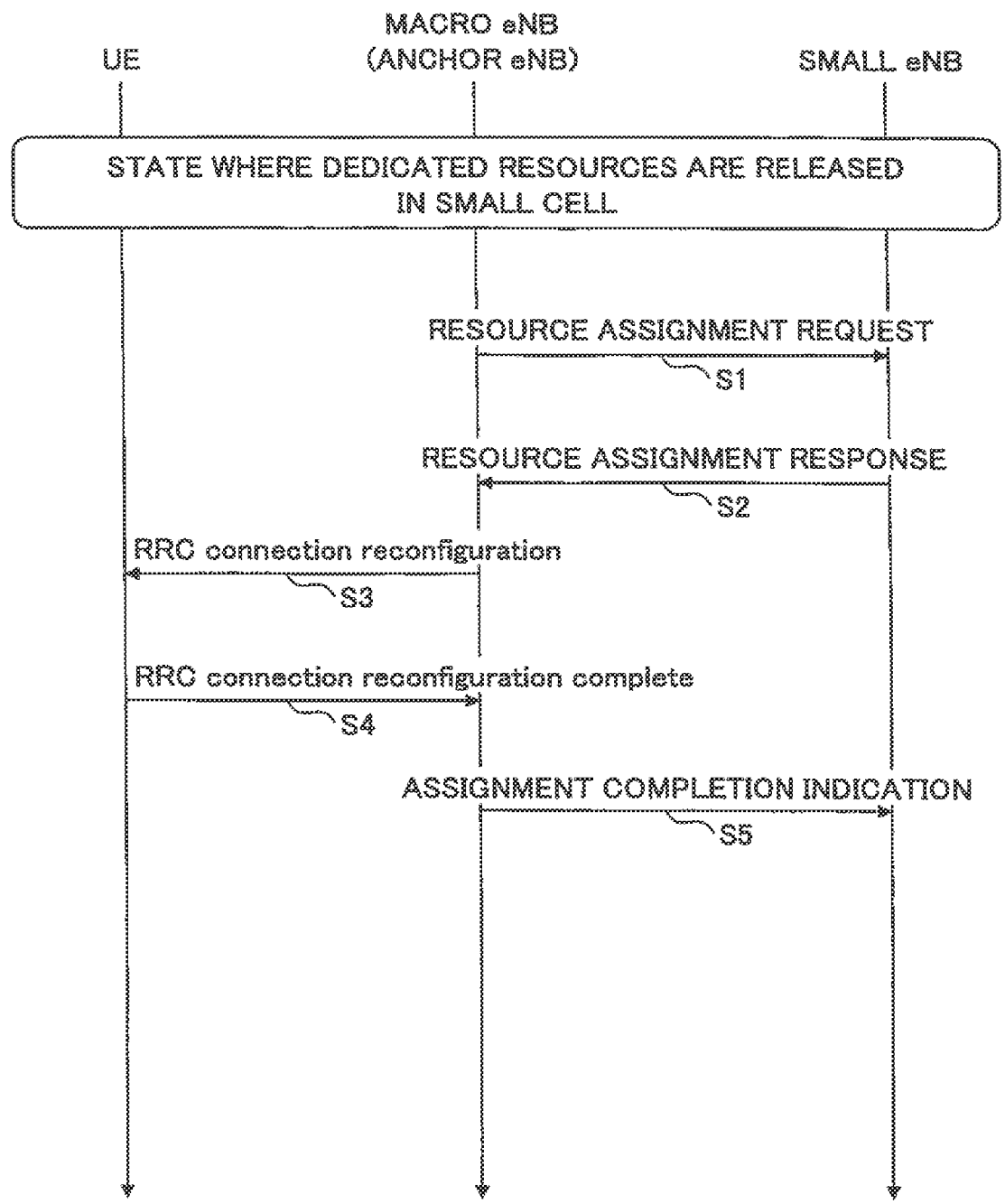
FIG. 2 is a sequence diagram for illustrating an uplink dedicated resource reconfiguration operation.
Figure 3:
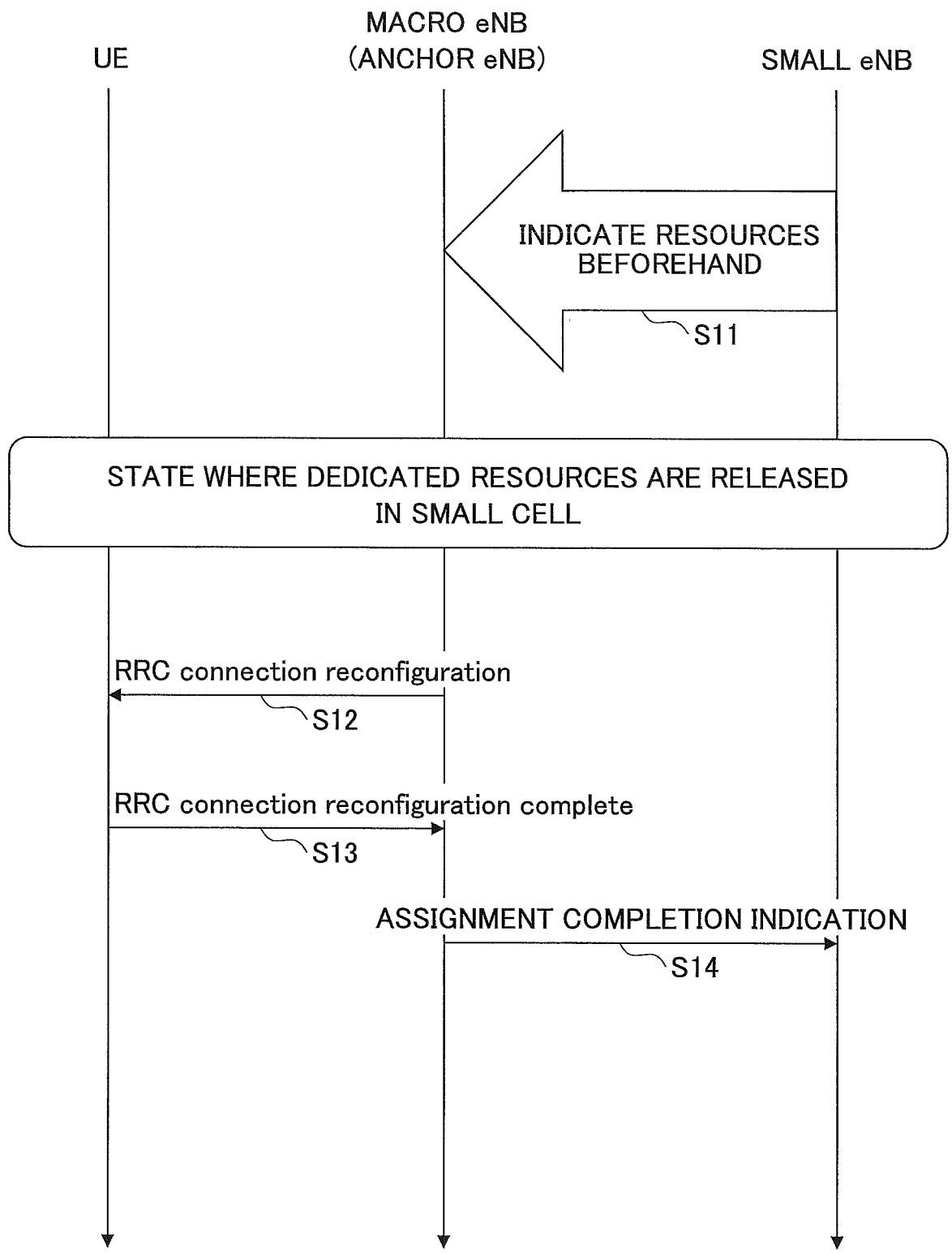
FIG. 3 is a sequence diagram for illustrating an uplink dedicated resource configuration operation according to one embodiment of the present invention.

Specifically, as illustrated in FIG. 3, at step S11, a small base station reserves a portion of radio resources in a small cell for a macro base station beforehand and sends the macro base station pooling information indicative of the reserved radio resources. Then, when inter-eNB carrier aggregation is initiated under a state where uplink dedicated resources in the small cell are released (that is, communication between a user equipment and the small base station is restarted), the macro base station assigns the uplink dedicated resources indicated in the stored pooling information to the user equipment without performing a resource assignment procedure with the small base station. Specifically, at step S12, the macro base station sends the user equipment a RRC Connection Reconfiguration indicative of the assigned uplink dedicated resources. Upon receiving the RRC Connection Reconfiguration, at step S13, the user equipment performs a reconfiguration operation for RRC connection based on the indicated uplink dedicated resources in the small base station and sends the macro base station a RRC Connection Reconfiguration Complete after completion of the reconfiguration operation. Upon receiving the RRC Connection Reconfiguration Complete, at step S14, the macro base station sends the small base station an assignment completion indication. Then, radio communication is established between the user equipment and the small base station, and the user equipment can use the assigned uplink dedicated resources. As a result, the assignment operation as illustrated in FIG. 2 does not have to be performed between the macro base station and the small base station, and the user equipment can use the uplink dedicated resources indicated from the macro base station to communicate with the small base station promptly.

Figure 4:
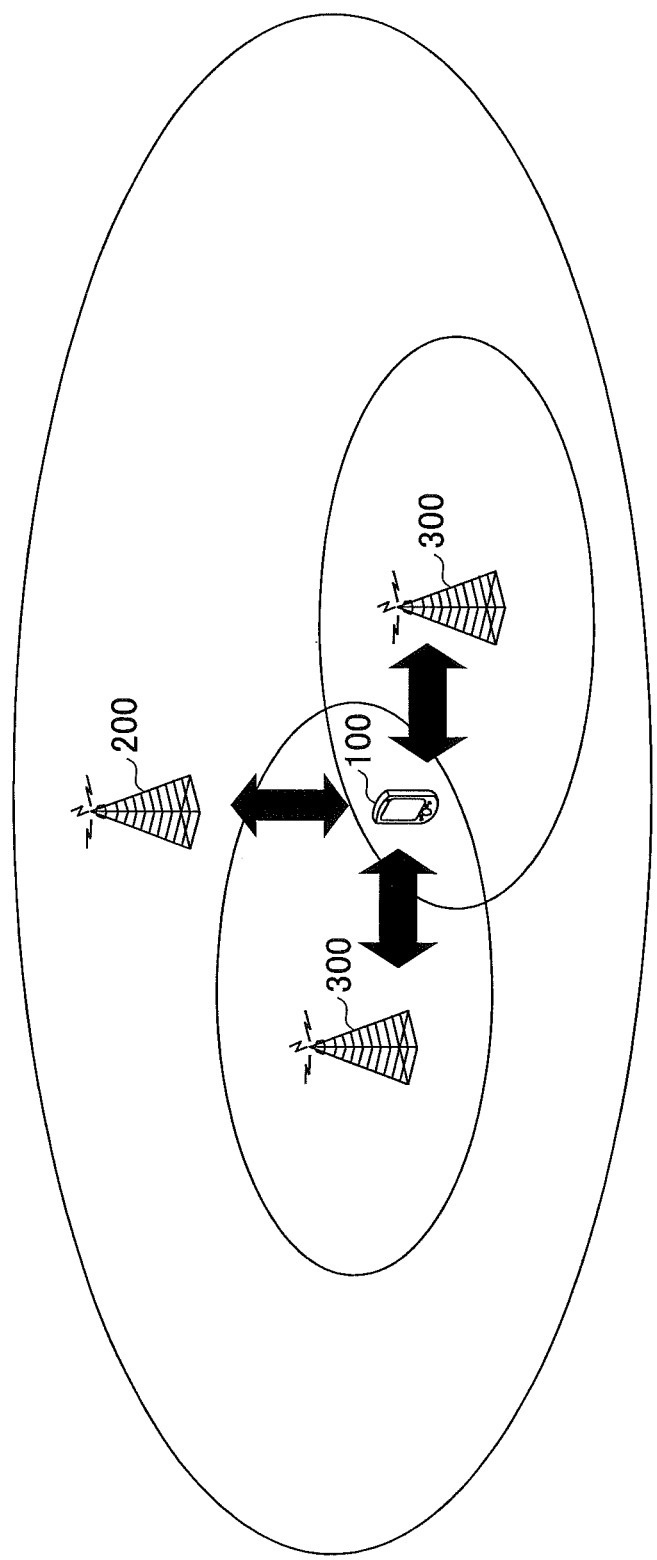
FIG. 4 is a schematic view of a radio communication system according to one embodiment of the present invention.

At the outset, a radio communication system according to one embodiment of the present invention is described with reference to FIG. 4. FIG. 4 is a schematic view of a radio communication system according to one embodiment of the present invention.

As is shown in FIG. 4, a radio communication system 10 is a radio communication system that supports radio communication using inter-eNB carrier aggregation such as a LTE-Advanced system. The radio communication system 10 has a user equipment 100, a macro base station 200 and a small base station 300.

The user equipment 100 is any information processing device having a radio communication function such as a mobile phone, a smartphone, a tablet and a mobile router. Also, the user equipment 100 supports the inter-eNB carrier aggregation for communication using a macro cell served by the macro base station 200 and a small cell served by the small base station 300 simultaneously.

The macro base station 200 wirelessly connects to the user equipment 100 to send the user equipment 100 downlink (DL) data received from a communicatively connected upper station or server (not shown) as well as to send the upper station (not shown) uplink (UL) data received from the user equipment 100. Also, the macro base station 200 serves as an anchor base station in the inter-eNB carrier aggregation and configures a small cell served by the controlled small base station for the user equipment 100. In the case where the inter-eNB carrier aggregation is applied, for example, the macro base station 200 mainly exchanges control signals or C-plane data with the user equipment 100 so as to ensure reliable radio connection to the user equipment 100.

The small base station 300 serves as a non-anchor base station controlled by the macro base station 200 and in response to reception of a resource assignment request for requesting to assign radio resources to the user equipment 100 from the macro base station 200, configures radio resources in a small cell for the user equipment 100. The user equipment 100 uses the configured radio resources to communicate with the small base station 300. In the case where the inter-eNB carrier aggregation is applied, for example, the small base station 300 mainly exchanges data signals or U-plane data with the user equipment 100 so as to ensure high throughput communication with the user equipment 100.

Figure 5:
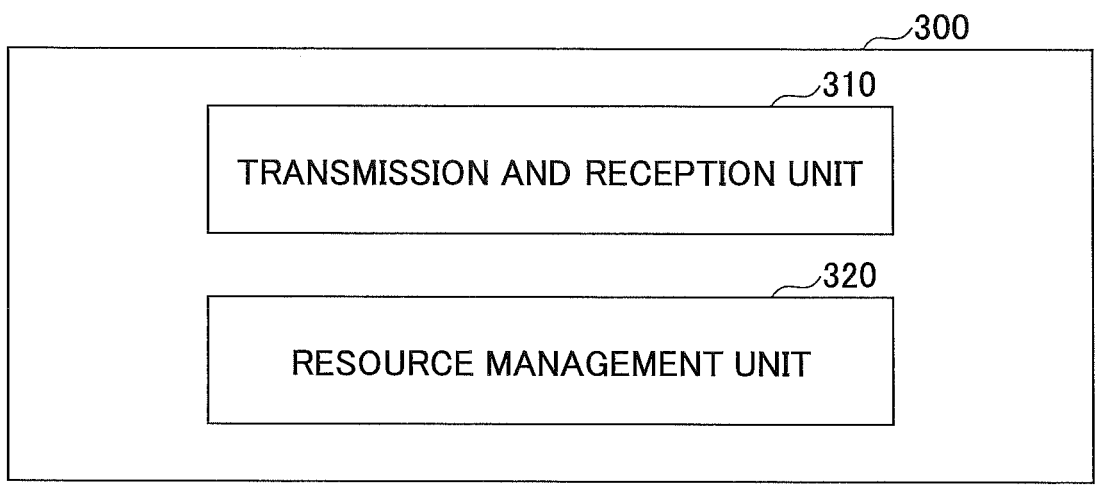
FIG. 5 is a block diagram for illustrating an arrangement of a small base station according to one embodiment of the present invention.

Next, an arrangement of a small base station according to one embodiment of the present invention is described with reference to FIG. 5. The small base station 300 serves as a non-anchor base station in the inter-eNB carrier aggregation controlled by the macro base station 200 serving as an anchor base station. FIG. 5 is a block diagram for illustrating an arrangement of a small base station according to one embodiment of the present invention.

As is shown in FIG. 5, the small base station 300 has a transmission and reception unit 310 and a resource management unit 320.

The transmission and reception unit 310 uses radio resources to communicate with the user equipment 100. When the inter-eNB carrier aggregation is applied to the user equipment 100, the transmission and reception unit 310 uses radio resources assigned to the user equipment 100 to exchange various signals and channels with the user equipment 100.

The resource management unit 320 manages radio resources for use in communication with the user equipment 100. The resource management unit 320 reserves a portion of the radio resources for the macro base station 200 in advance and sends the macro base station 200 pooling information indicative of the reserved radio resources. When radio resources in the small cell have to be assigned to the user equipment 100, the macro base station 200 retrieves radio resources to assign to the user equipment 100 from the radio resources indicated in the pooling information and autonomously assigns the retrieved radio resources to the user equipment 100 without performing an assignment operation between the macro base station 200 and the small base station 300.

Here, the radio resources reserved for the macro base station 200 may be identified by frequency positions and/or time positions. For example, the pooling information may indicate "relying on the macro base station 200 to make an assignment of two resources blocks (RBs) from a band end of a PUCCH resource", "relying on the macro base station 200 to make an assignment of a radio resource of subframe number #0" or both.

For remaining radio resources in the small cell other than the radio resources reserved for the macro base station 200, the resource management unit 320 may assign the remaining radio resources to other user equipments newly connecting to the small base station 300, that is, other connecting user equipments connecting to the small cell as a primary cell or an anchor cell.

Also, as a result of the macro base station 200 assigning the reserved radio resources to the user equipment 100 or other user equipments, if radio resources available to the macro base station 200 become insufficient, the macro base station 200 may request the small base station 300 to reserve additional radio resources for the macro base station 200. Upon receiving such an additional reservation request, the resource management unit 320 may check a usage state of radio resources in the small cell and determine whether the additional radio resources can be reserved based on the usage state.

For example, if a ratio of unassigned radio resources to the remaining radio resources other than the radio resources reserved for the macro base station 200 is higher than or equal to a predefined threshold, the resource management unit 320 may determine that the additional radio resources can be reserved and reserve a portion or all of the unassigned radio resources for the macro base station 200. On the other hand, if the ratio of unassigned radio resources to the remaining radio resources other than the radio resources reserved for the macro base station 200 is lower than the predefined threshold, the resource management unit 320 may determine that the additional radio resources cannot be reserved and indicate to the macro base station 200 that the additional radio resources cannot be reserved.

Also, the resource management unit 320 may update the radio resources reserved for the macro base station 200 in a periodic manner or at a predefined time and send the macro base station 200 the updated pooling information. For example, this updating may be performed based on a usage state of the reserved radio resources from the previous updating and/or a usage state of the remaining radio resources from the previous updating. If the reserved radio resources are not so much utilized in the macro base station 200 (for example, if a maximum utilization rate indicative of a ratio of the maximum resource usage amount to the amount of the reserved radio resources in this period is lower than or equal to a predefined threshold percentage), the resource management unit 320 may decrease the radio resource reserved for the macro base station 200. On the other hand, if the reserved radio resources are sufficiently utilized in the macro base station 200 (for example, if the maximum utilization rate is higher than or equal to the predefined percentage or if an additional reservation request is received from the macro base station 200), the resource management unit 320 may increase the radio resources reserved for the macro base station 200. Accordingly, the pooling information can be dynamically configured depending on the usage state of the reserved radio resources.

Alternatively, if the remaining radio resources are not so much utilized in the small base station 300 (for example, if a maximum utilization rate indicative of a ratio of the maximum resource usage amount to the amount of the remaining radio resources in this period is lower than or equal to a predefined threshold percentage), the resource management unit 320 may increase the radio resources reserved for the macro base station 200. On the other hand, the remaining radio resources are sufficiently utilized in the small base station 300 (for example, if the maximum utilization rate is higher than or equal to the predefined threshold percentage), the resource management unit 320 may decrease the radio resources reserved for the macro base station 200. Accordingly, the pooling information can be dynamically configured depending on the usage state of the remaining radio resources.

Figure 6:
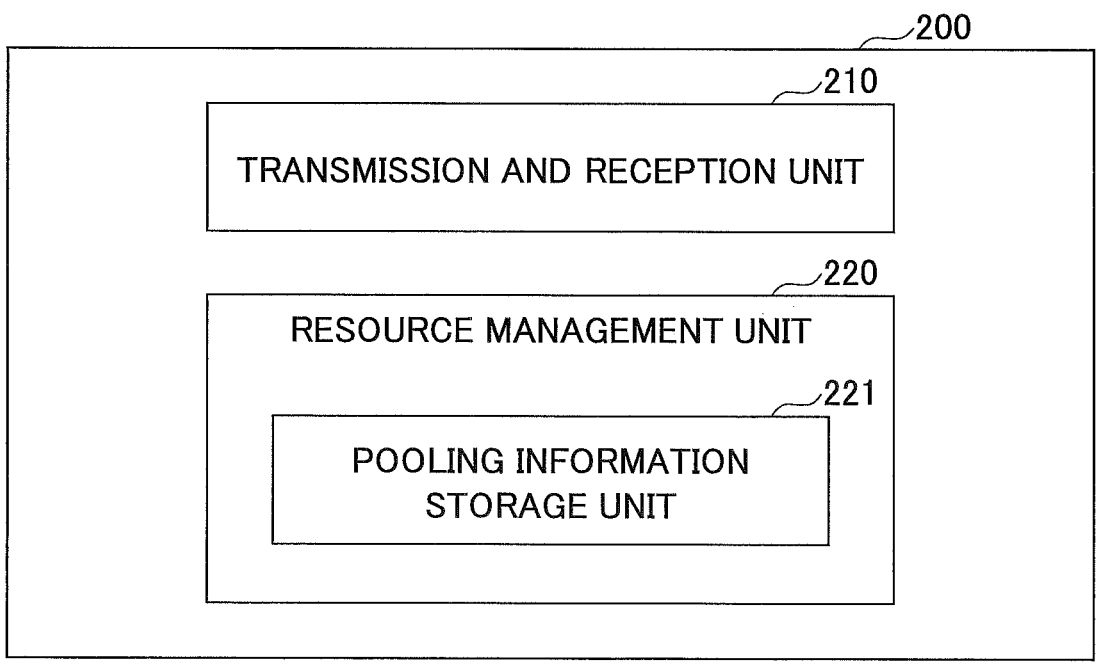
FIG. 6 is a block diagram for illustrating an arrangement of a macro base station according to one embodiment of the present invention.

Next, an arrangement of a macro base station according to one embodiment of the present invention is described with reference to FIG. 6. The macro base station 200 serves as an anchor base station in the inter-eNB carrier aggregation and manages the small base station 300 under control. FIG. 6 is a block diagram for illustrating an arrangement of a macro base station according to one embodiment of the present invention.

As is shown in FIG. 6, the macro base station 200 has a transmission and reception unit 210 and a resource management unit 220, and the resource management unit 220 has a pooling information storage unit 221.

The transmission and reception unit 210 uses radio resources to communicate with a user equipment. The transmission and reception unit 210 exchanges various channels and signals with the user equipment 100.

The resource management unit 220 manages radio resources for use in communication with the user equipment 100. As stated above, the small base station 300 reserves radio resources for the macro base station 200 in advance and sends pooling information indicative of the reserved radio resources. The resource management unit 220 stores the received pooling information in the pooling information storage unit 221 and when radio resources in a small cell have to be assigned to the user equipment 100, autonomously assigns a portion or all of the radio resources indicated in the pooling information to the user equipment 100 without performing a radio resource assignment operation between the macro base station 2000 and the small base station 300.

For example, if the user equipment 100 requests the macro base station 200 to assign uplink dedicated resources in the small cell, the resource management unit 220 assigns unassigned radio resources from the radio resources in the small cell indicated in the stored pooling information to the user equipment 100 as the requested uplink dedicated resources and indicates the assigned uplink dedicated resources to the user equipment 100. Upon receiving the indication, the user equipment 100 can use the assigned uplink dedicated resources to communicate with the small base station 300.

In one embodiment, upon receiving an assignment request for uplink dedicated resources from the user equipment via the transmission and reception unit 210, the resource management unit 220 determines whether the requested uplink dedicated resources belong to a cell in the macro base station 200 or a cell in the small base station 300 and assigns the radio resources indicated in the pooling information or radio resources of the macro base station 200 to the user equipment 100 as the requested uplink dedicated resources depending on the determination. In other words, if the user equipment 100 requests an assignment of uplink dedicated resources in the small cell, the resource management unit 220 assigns the requested uplink dedicated resources to the user equipment 100 from the radio resources indicated in the pooling information. On the other hand, if the user equipment 100 requests uplink dedicated resources in the macro cell, the resource management unit 220 assigns the requested uplink dedicated resources to the user equipment 100 from unassigned radio resources in the macro base station 200. Accordingly, the user equipment 100 can communicate with the macro base station 200 or the small base station 300 using the uplink dedicated resources promptly.

The autonomous assignment of radio resources or uplink dedicated resources may be performed when initially configuring the small cell for the user equipment 100 or when performing reassignment after the radio resources or the uplink dedicated resources have been released in response to occurrence of a predefined release trigger after configuring the small cell.

Also, when the reserved radio resources become insufficient, the resource management unit 220 may send the small base station 300 an additional reservation request to reserve additional radio resources. For example, when the amount of unassigned radio resources in the reserved radio resources falls below a predefined threshold percentage, the resource management unit 220 may send the small base station 300 an additional reservation request. Accordingly, it is possible to avoid shortage of the radio resources in the small cell reserved for the macro base station 200 beforehand.

Next, an uplink dedicated resource management operation in a macro base station according to one embodiment of the present invention is described with reference to FIG. 7. FIG. 7 is a flowchart for illustrating an uplink dedicated resource management operation in a macro base station according to one embodiment of the present invention. For example, this operation starts in response to reception of pooling information from the small base station 300 beforehand.

As is shown in FIG. 7, at step S101, the macro base station 200 receives an assignment request to reassign uplink dedicated resources from the user equipment 100.

At step S102, the macro base station 200 determines whether the requested uplink dedicated resources belong to the small cell or the macro cell.

If the uplink dedicated resources belong to the small cell (S102: Y), at step S103, the macro base station 200 retrieves a portion or all of the radio resources in the small cell reserved for the macro base station 200 indicated in the pooling information and assigns the retrieved radio resources to the user equipment 100. Upon receiving the indication of the assigned radio resources in the small cell, the user equipment 100 uses the radio resources to communicate with the small base station 300 in the uplink dedicated resources.

On the other hand, if the uplink dedicated resources belong to the macro cell (S102: N), at step S104, the macro base station 200 uses unassigned radio resources in the macro base station 200 to communicate with the user equipment 100 in the uplink dedicated resources.

In this manner, the macro base station 200 can use the pooling information to autonomously assign the uplink dedicated resources to the user equipment 100.

Although the embodiments of the present invention have been described above, the present invention is not limited to the above-stated specific embodiments, and various modifications and variations can be made within the spirit of the present invention as recited in claims.

This international patent application is based on Japanese Priority Application No. 2013-029461 filed on Feb. 18, 2013, the entire contents of which are hereby incorporated by reference.

LIST OF REFERENCE SYMBOLS

10: radio communication system
100: user equipment
200: macro base station
210: transmission and reception unit
220: resource management unit
221: pooling information storage unit
300: small base station
310: transmission and reception unit
320: resource management unit

The invention claimed is:

1. A base station managing Radio Resource Control (RRC), comprising:
a transmission and reception circuit that uses radio resources to communicate with a user equipment;
a processor that manages the radio resources; and
a memory that stores pooling information that indicates radio resources reserved for the base station managing RRC by a base station communicating with the base station managing RRC,
wherein when the transmission and reception circuit receives an assignment request for uplink dedicated resources from the user equipment, the processor
determines whether the requested uplink dedicated resources belong to a cell in the base station managing RRC or a cell in the base station communicating with the base station managing RRC, and
autonomously assigns, via the RRC, the radio resources indicated in the pooling information or radio resources of the base station managing RRC to the user equipment as the requested uplink dedicated resources depending on the determination.

2. The base station managing RRC as claimed in claim 1, wherein when the processor initially configures the base station communicating with the base station managing RRC for the user equipment or reassigns uplink dedicated resources released after configuring the base station communicating with the base station managing RRC, the processor autonomously assigns the radio resources indicated in the pooling information to the user equipment.

3. The base station managing RRC as claimed in claim 1, wherein when an amount of unassigned radio resources in the reserved radio resources falls below a predefined threshold, the processor sends the base station communicating with the base station managing RRC an additional reservation request for reserving additional radio resources.

4. A method in a base station managing Radio Resource Control (RRC) communicating with a user equipment:
receiving an assignment request for uplink dedicated resources from the user equipment;
determining whether the requested uplink dedicated resources belong to a cell in the base station managing RRC or a cell in a base station communicating with the base station managing RRC; and
autonomously assigning, via the RRC, radio resources indicated in stored pooling information indicative of radio resources reserved for the base station managing RRC by the base station communicating with the base station managing RRC or radio resources of the base station managing RRC to the user equipment as the requested uplink dedicated resources depending on the determination.

* * * * *